UNITED STATES PATENT OFFICE.

OTTO LIEBKNECHT, OF FRANKFORT-ON-THE-MAIN, GERMANY.

METHOD OF PRODUCING ALKALI-METAL CYANATES.

1,406,662.  Specification of Letters Patent.  Patented Feb. 14, 1922.

No Drawing.  Application filed May 23, 1919.  Serial No. 299,312.

*To all whom it may concern:*

Be it known that I, OTTO LIEBKNECHT, a citizen of the Republic of Germany, residing at Frankfort-on-the-Main, Germany, have invented a new and useful Method of Producing Alkali-Metal Cyanates, (for which I have filed an application in Germany, Sept. 11, 1917, in accordance with Order No. 2660,) of which the following is a specification.

It has been found that alkali metal cyanides are very easily oxidized in aqueous solution to cyanates in presence of alkali metal peroxide. The alkali metal peroxide is thereby converted into alkali metal hydroxide which is a valuable by-product.

Reactions other than these do not occur to any great extent.

It has further been observed that alkali metal cyanates are very nearly insoluble in concentrated solutions of alkali metal hydroxide. It is therefore possible by choosing the right concentration to obtain an almost quantitative yield, the alkali metal cyanates separating out in crystals.

As alkali metal cyanides may be used cyanide of sodium or cyanide of potassium or mixtures thereof, and as alkali metal peroxide sodium peroxide.

Instead of alkali metal peroxid, substances such as hydrogen peroxid, percarbonates, perborates and similar compounds which easily liberate oxygen, may be used in the presence of free alkali.

In carrying out my process I proceed for instance as follows: 4 parts by weight of sodium cyanide are dissolved in 25 to 26 parts of water and 8 parts by weight of sodium peroxide are introduced at a temperature of about 30 to 40° C. As the temperature rises considerably on adding the peroxide, cooling is necessary. Towards the end of the operation the cooling is moderated, causing thereby a rise of temperature. This rise of temperature continues even after the introduction of the sodium peroxide has stopped. The temperature is then allowed to go up to 60 to 70° C., whereafter a fall of the temperature indicates the end of the reaction. Finally the solution is cooled down to 5 to 10° C. and the crystalline precipitate separated from the liquid in the usual manner. The lye, after evaporation of the solution to dryness, may be used for the production of alkali metal by electrolysis, the metal being converted again into peroxide and so on.

It will be understood that I do not confine myself to the quantities and the proportions stated above.

By adding to the cyanide solution substances protecting the compounds containing active oxygen from self-decomposition (negative catalyzers) the oxidizing effect towards the cyanide is increased.

One may add silicates, for instance silicate of magnesium, of sodium or mixtures thereof, as negative catalyzers.

The process can also be carried out in such a manner that the cyanide in the solid state or in solution is added to a solution or suspension containing the oxidizer.

It has been found advantageous to add free alkali to the cyanide solution before starting the process, as it apparently acts favorably by diminishing the dissociation of the cyanide and cyanate thereby avoiding saponification, i. e., hydrolysis.

I claim—

1. Method for producing alkali metal cyanate by bringing into reaction, in presence of water, alkali metal cyanid with alkali metal peroxid.

2. Method for producing alkali metal cyanate by bringing into reaction, in presence of water, alkali metal cyanid with an alkali metal compound containing active oxygen.

3. Method for producing alkali metal cyanate, by bringing into reaction, in presence of water and of free alkali, alkali metal cyanid with a substance containing active oxygen.

4. Method for producing alkali metal cyanate by bringing into reaction in presence of water, alkali metal cyanid with alkali metal peroxid at such concentration as to precipitate the cyanate in crystals.

5. Method for producing alkali metal cyanate by bringing into reaction, in presence of water, alkali metal cyanid with an alkali metal compound containing active oxygen at such concentration as to precipitate the cyanate in crystals.

6. Method for producing alkali metal cyanate by bringing into reaction, in presence of water and of free alkali, alkali metal cyanid with a substance containing active oxygen, at such concentration as to precipitate the cyanate in crystals.

7. Method for producing alkali metal cyanate by bringing into reaction, in presence of water and of free alkali, alkali metal cyanid with alkali metal peroxid.

8. Method for producing alkali metal cyanate by bringing into reaction, in presence of water and of free alkali, alkali metal cyanid with an alkali metal compound containing active oxygen.

9. Method for producing alkali metal cyanate by bringing into reaction, in presence of water and of free alkali, alkali metal cyanid with alkali metal peroxid, at such concentration as to precipitate the cyanate in crystals.

10. Method for producing alkali metal cyanate by bringing into reaction, in presence of water and of free alkali, alkali metal cyanid with an alkali metal compound containing active oxygen, at such concentration as to precipitate the cyanate in crystals.

11. Method for producing alkali metal cyanate by bringing into reaction alkali metal cyanid with a substance containing active oxygen, at such concentration as to precipitate the cyanate crystals, the cyanid being in the form of an aqueous solution containing free alkali before the reaction is allowed to begin.

12. Method for producing alkali metal cyanate by bringing into reaction, in presence of water and of a substance for preventing self-decomposition of compounds containing active oxygen, alkali metal cyanid with alkali metal peroxid.

13. Method for producing alkali metal cyanate by bringing into reaction, in presence of water and of a substance for preventing self decomposition of compounds containing active oxygen, alkali metal cyanid with an alkali metal compound containing active oxygen.

14. Method for producing alkali metal cyanate by bringing into reaction, in presence of water, of free alkali and of a substance for preventing self-decomposition of compounds containing active oxygen, alkali metal cyanid and a compound containing active oxygen.

15. Method for producing alkali metal cyanate by bringing into reaction, in presence of water and of a substance for preventing self-decomposition of compounds containing active oxygen, alkali metal cyanid with alkali metal peroxid, at such concentration as to precipitate the cyanate in crystals.

16. Method for producing alkali metal cyanate by bringing into reaction, in presence of water and of a substance for preventing self-decomposition of compounds containing active oxygen, alkali metal cyanid with an alkali metal compound containing active oxygen, at such concentration as to precipitate the cyanate in crystals.

17. Method for producing alkali metal cyanate by bringing into reaction, in the presence of water, of free alkali, and of a substance for preventing self-decomposition of compounds containing free oxygen, alkali metal cyanid and a substance containing active oxygen, at such concentration as to precipitate the cyanate in crystals.

18. Method for producing alkali metal cyanate by bringing into reaction, in presence of water, of free alkali, and of a substance for preventing self-decomposition of compounds containing active oxygen, alkali metal cyanid with alkali metal peroxid, at such concentration as to precipitate the cyanate in crystals.

19. Method for producing alkali metal cyanate by bringing into reaction in presence of water, of free alkali, and of a substance for preventing self-decomposition of compounds containing active oxygen, alkali metal cyanid with an alkali metal compound containing active oxygen, at such concentration as to precipitate the cyanate produced in crystals.

20. Method for producing alkali metal cyanate by bringing into reaction in the presence of a substance preventing self-decomposition of substances containing active oxygen, alkali metal cyanid with a substance containing active oxygen, at such concentration as to precipitate the cyanate in crystals, the cyanid being in the form of an aqueous solution containing free alkali before the reaction is allowed to begin.

21. Method for producing alkali metal cyanate by bringing into reaction, in presence of water and of a negative catalyzer for preventing self-decomposition of substances containing active oxygen, alkali metal cyanid with alkali metal peroxid.

22. Method for producing alkali metal cyanate by bringing into reaction, in presence of water and of a negative catalyzer for preventing self-decomposition of substances containing active oxygen, alkali metal cyanid with an alkali metal compound containing active oxygen.

23. Method for producing alkali metal cyanate by bringing into reaction, in presence of water, of free alkali, and of a negative catalyzer for preventing self-decomposition of substances containing active oxygen, alkali metal cyanid with a substance containing active oxygen.

24. Method for producing alkali metal cyanate by bringing into reaction, in presence of water and of a metal silicate for preventing self-decomposition of substances containing active oxygen, alkali metal cyanid with alkali metal peroxid.

25. Method for producing alkali metal cyanate by bringing into reaction, in presence of water and of a metal silicate for preventing self-decomposition of substances containing active oxygen, alkali metal cyanid with an alkali metal compound containing active oxygen.

26. Method for producing alkali metal cyanate by bringing into reaction, in presence of water, of free alkali, and of a metal silicate for preventing self-decomposition of substances containing active oxygen, alkali metal cyanid with a substance containing active oxygen.

In testimony whereof I have signed my name to this specification in the presence of two subscribing witnesses.

DR. OTTO LIEBKNECHT.

Witnesses:
ABNER LAUCK,
AUGUST CHRISTIAN.